June 2, 1953        G. L. TURNER        2,640,611
INDUSTRIAL TRUCK
Filed Oct. 22, 1948        4 Sheets-Sheet 1
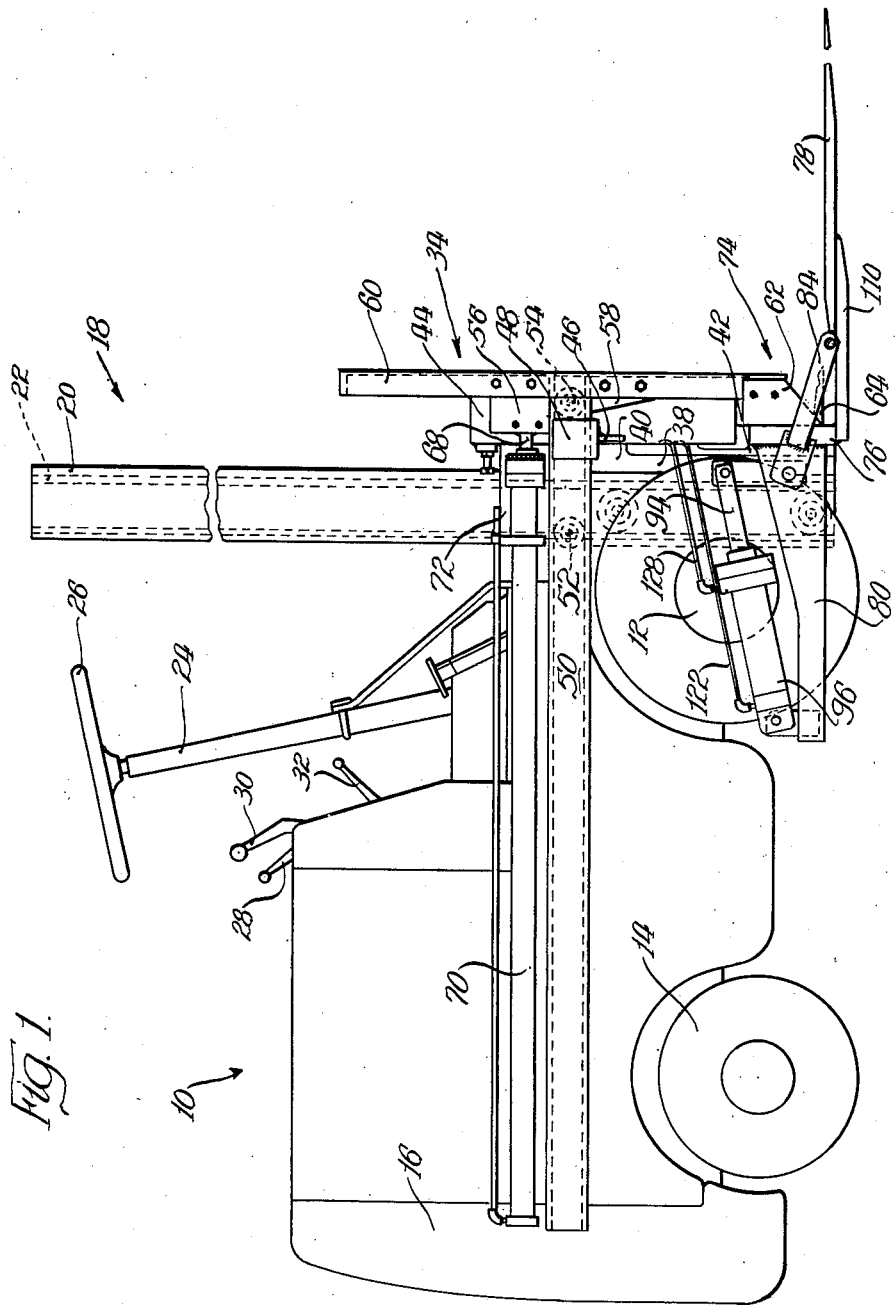
INVENTOR.
George L. Turner
BY
Brown Jackson Boettcher Dienner
Attys.

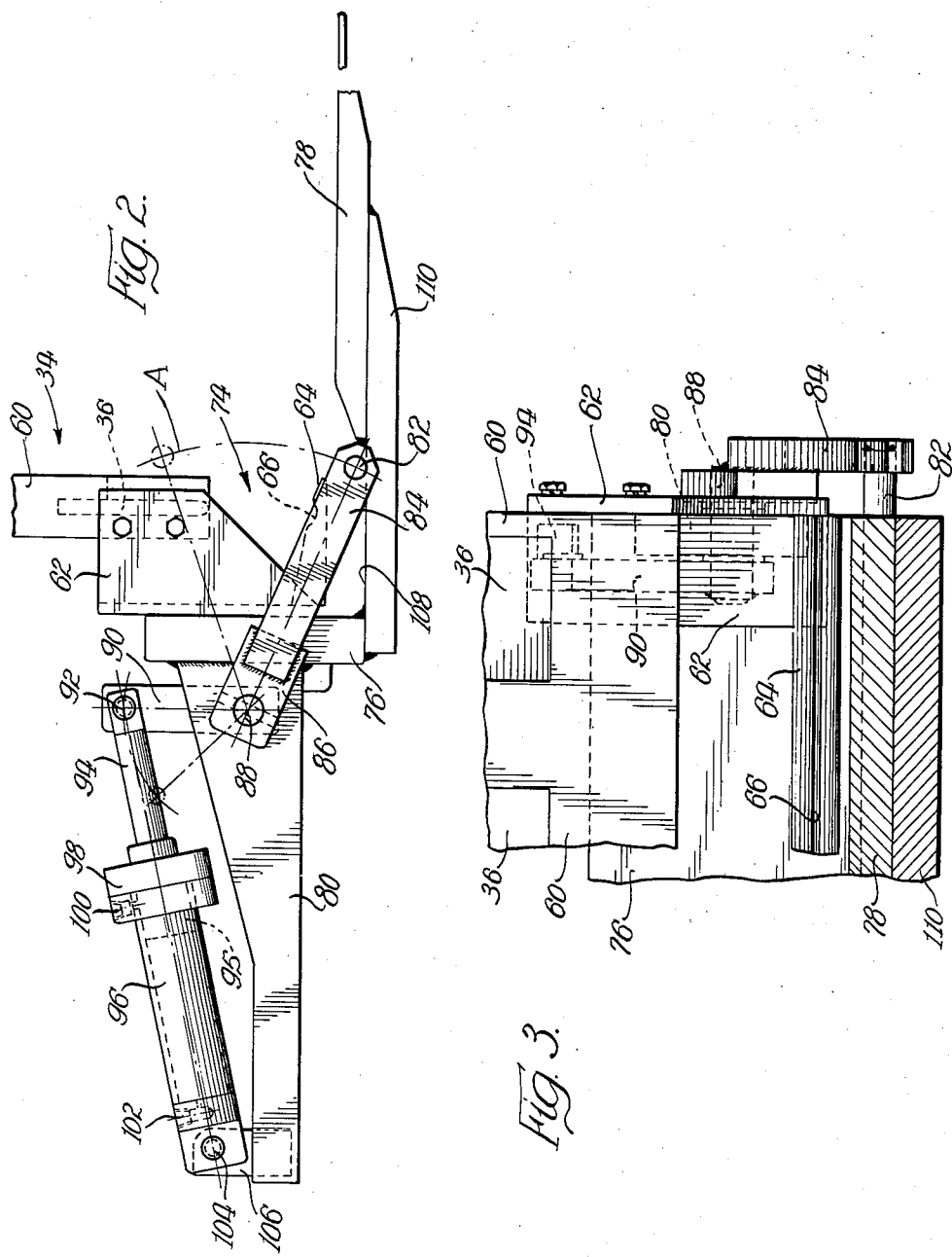

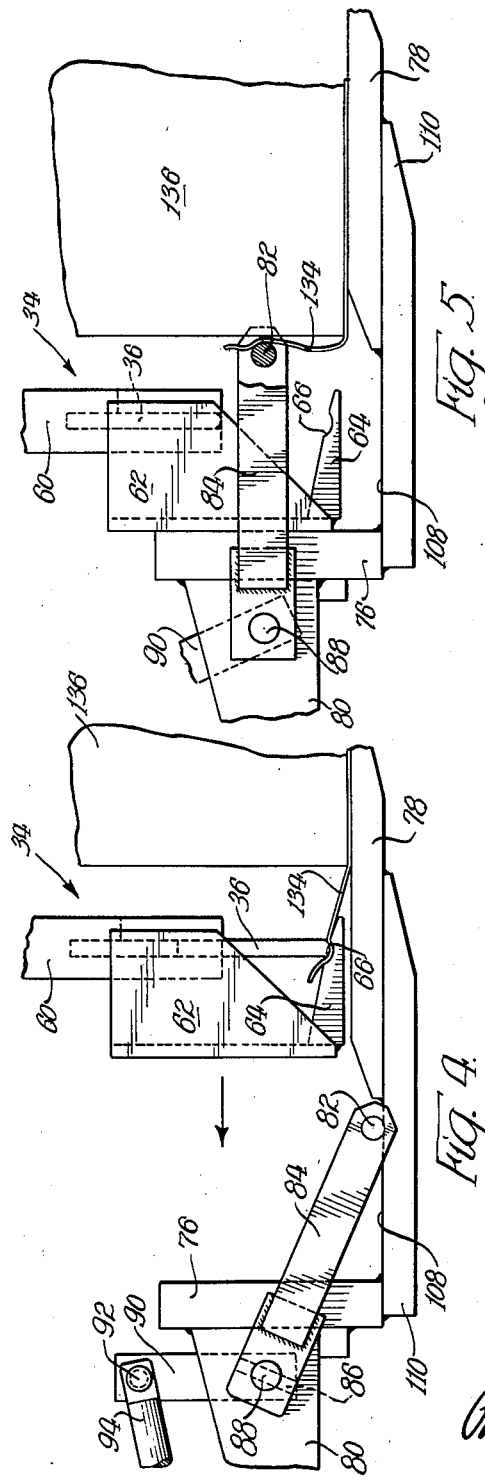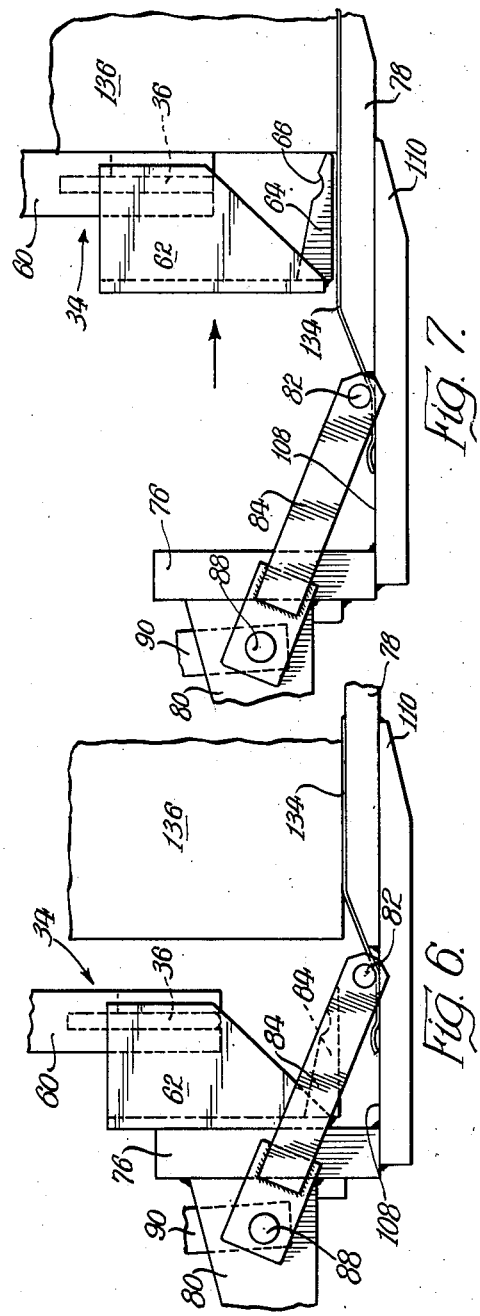

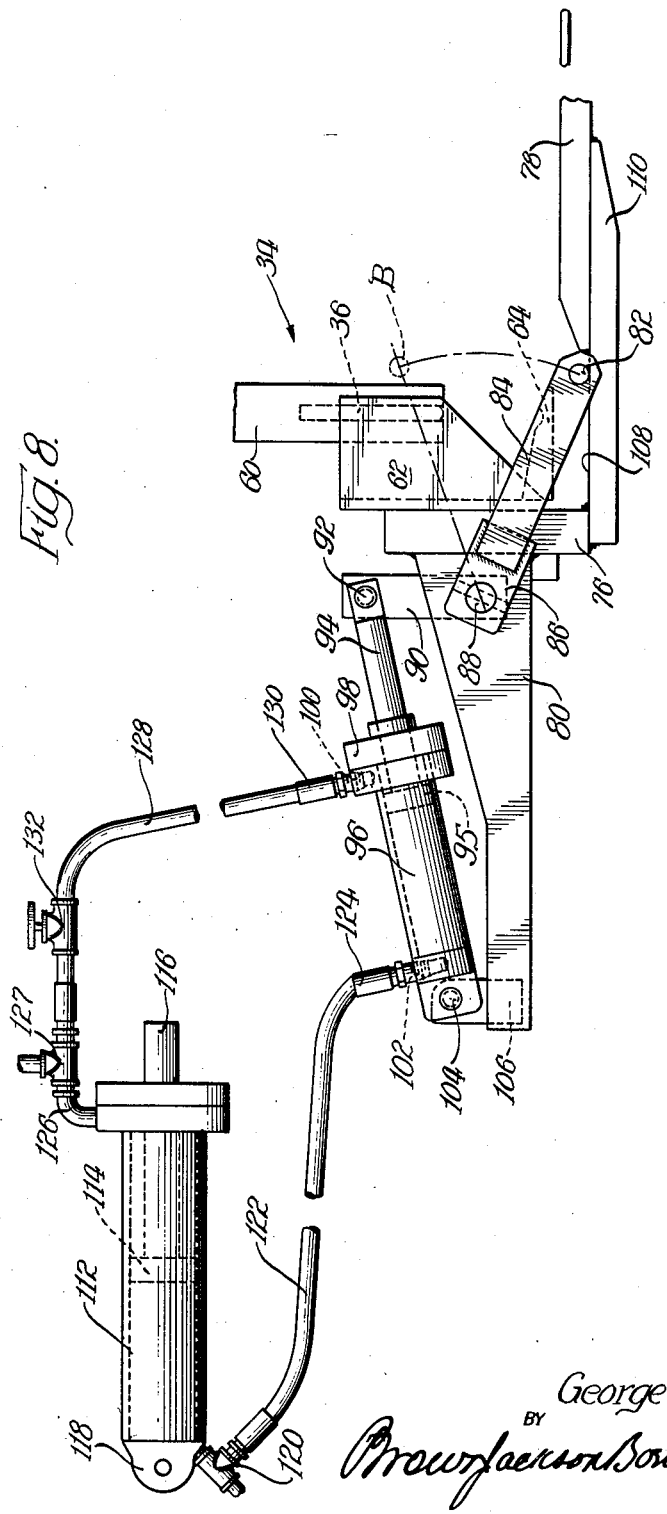

Patented June 2, 1953

2,640,611

UNITED STATES PATENT OFFICE 2,640,611

INDUSTRIAL TRUCK

George L. Turner, Battle Creek, Mich., assignor to Clark Equipment Company, Buchanan, Mich., a corporation of Michigan Application October 22, 1948, Serial No. 55,982

14 Claims. (Cl. 214—510)

My invention relates generally to industrial trucks and more particularly to an industrial truck which is adapted to draw a sheet-like pallet on which a load is disposed, on to a load supporting member of the truck and to push the load off of said member, together with mechanism for retaining the pallet on the load supporting member when the load is discharged therefrom.

The present invention constitutes an improvement on the industrial truck disclosed in the co-pending application of George L. Turner and Fred Sherriff, Serial No. 766,558, filed August 6, 1947 now Patent No. 2,590,355, granted March 25, 1952. The present invention is also directed to an improved means for handling material disposed on a pallet, and more particularly on a sheet-like pallet, such as that illustrated in the co-pending application of George L. Turner, Serial No. 717,769, filed December 12, 1946.

The latter application disclosed a method of handling material on a sheet-like pallet which may be drawn on to a load supporting surface of an industrial truck by gripping a traction portion of the pallet and subsequently releasing the grip on said pallet and discharging it and the unit load from the load supporting surface. It is contemplated that such load supporting surface may be vertically movable and tiltable forwardly and backwardly. In some handling operations of material on a sheet-like pallet the handler may desire to retain the pallet and to discharge the load from the pallet and the load supporting surface of the industrial truck. An example of such instance is when the load is discharged into a box car truck or the like for transport to a distant point.

It is an object of the present invention to provide means whereby a sheet-like pallet and load may be drawn on to the load supporting surface of an industrial truck and may thereafter be retained on the load supporting surface while permitting discharge of the load from the pallet and truck.

It is a further object of the invention to provide suitable mechanism for handling the material in that manner. In the preferred form of the mechanism the means for retaining the pallet on the load supporting surface, together with said surface, is readily adapted for installation as a unit on existing industrial trucks and is adapted for easy removal to permit the substitution of other load supporting surfaces such as a standard lift fork.

It is another object of the invention to provide control mechanism for the pallet retaining mechanism whereby the operator is enabled selectively to retain the pallet on the load supporting surface, or to discharge it therefrom, when the load is discharged.

It is another object of the invention to provide remote control means for the operator of the industrial truck whereby the pallet retaining means is operable by the driver of the truck from the driver's seat.

It is yet another object of the invention that the actuating means for said pallet retaining mechanism be operated in response to the direction in which the load supporting surface is tilted by the operator.

Other objects, uses and advantages of my invention will become apparent, or be obvious, from the following description when taken with the accompanying drawings in which:

Figure 1 is a side elevational view of a conventional type of industrial truck incorporating the present invention;

Figure 2 is an enlarged side elevational view showing the mechanism of the present invention alone;

Figure 3 is a partial front elevational view of the mechanism shown in Figure 2, certain portions of the mechanism being shown in section;

Figure 4 is a fragmentary view of the pallet retaining mechanism of my invention showing its position as a load is being drawn on to the load supporting member;

Figure 5 is a fragmentary view, similar to Figure 4, showing the pallet retaining mechanism of my invention in an intermediate position of its pallet clamping movement;

Figure 6 is a fragmentary view, similar to Figure 4, showing the mechanism of my invention in a position wherein a pallet is clamped between it and the load supporting member;

Figure 7 is a fragmentary view, similar to Figure 4, showing the pallet retained on the load supporting member and with the load being discharged from the pallet and member; and Figure 8 shows a portion of the hydraulic system for actuating the mechanism of my invention.

Like reference numerals have been employed in the several views to indicate the same or similar elments.

Referring now to Figures 1, 2 and 3, there is shown an industrial truck, indicated generally by the reference numeral 10, said truck having a driving axle 12 and a steering axle 14 adjacent its opposite ends. A counter-weight 16 is carried at one end of the truck and at the other end there is supported a vertical mast, indicated generally by the reference numeral 18, which comprises pairs of channel-shaped, vertically extending, upright members, such as the members 20 and 22, which are telescopically arranged. The mast is pivotally mounted adjacent the lower end of the front portion of the chassis and may be actuated to tilt the mast forwardly or rearwardly and also to extend the telescopic member 22 vertically upwardly and downwardly.

The industrial truck is provided with a steering column 24 having at its upper end a conventional steering wheel which is manipulated by the operator. Control levers 28, 30 and 32 are provided for the operator, control 28, for example, controlling the vertical movement of the mast, control 30 controlling tilting of the mast and actuation of the mechanism of my invention, and control 32 serving to operate the pusher mechanism or load engaging frame, indicated generally by the reference numeral 34, and the vertically movable clamping jaw 36 (see Figure 2). The truck is additionally supplied with a motor and conventional clutch and brake pedals and suitable gear shift controls so that the vehicle may be driven either forwardly or backwardly.

A load supporting carriage 38 has an upper boss 40 and a lower boss 42. The carriage 38 is adapted to move upwardly and downwardly on the mast 18 and is adapted to be tilted forwardly or rearwardly when said mast is so tilted. To the upper boss 40 of the load supporting carriage 38 there is secured a plate (not shown) across the front of the truck and to each end of said plate is secured a side frame member 44. Each side frame member 44 has a bracket or gusset plate 46 secured to it, as by welding, and upon each plate 46 there is secured an angle member 48 for guiding a channel-shaped, extensible member 50 on each side of the vehicle, each of said channel members being extensible and retractable on rollers 52 and 54. Brackets 56 and 58 are connected to each channel-shape member 50 above and below it, as by welding, and to the brackets 56 and 58 is secured a frame 60 which is adapted to serve as a pusher and steadying device for the load which is adapted to be carried by the industrial truck.

On the sides of frame 60, at its lower end, are brackets 62 which carry a fixed jaw 64 between them. As may be seen more clearly in Figure 2, a movable jaw member 36 is carried in the lower end of the frame 60 between the brackets 62 and is guided in said frame for vertical movement toward and away the fixed jaw 64, the movable jaw being adapted to seat within the groove 66 of jaw 64 in order to form a crimping action on the margin of the pallet which it is adapted to grip. The movable jaw 36 is under the control of the operator through the control lever 32 and jaw 36 is adapted to engage the fixed jaw 64 when the operator actuates the control lever 32 in a direction to cause the frame 60 to be moved forwardly (that is, away from the mast 18), and the jaw is adapted to be retracted when the operator manipulates the control lever 32 in a direction to cause the frame 60 to be retracted.

Frame 60 which is connected to the load supporting carriage 38 is hydraulically actuated and the actuating mechanism includes a piston rod 68 which is connected at its outer end to the bracket 56 which, in turn, is connected to the channel member 50 and also to the frame 60. A hydraulic cylinder 70 for each piston rod 56 is connected to a bracket or plate 72 which, in turn, is connected to the side frame member 44 which is attached to the load supporting carriage 38.

From the foregoing, it will be apparent that the load supporting carriage 38 which is movable vertically on the mast 18 carries with it the load engaging mechanism 34 which serves as a pushing or discharging device and a load steadying device, and also carries with it the hydraulic mechanism 68, 70 for actuating said load engaging mechanism. The channels 50 guide and support the load engaging mechanism as it is moved toward and away from the mast 18 under the control of the operator. For a more detailed description of the structure above described and its mode of operation, reference may be made to the aforementioned joint application of myself and Fred Sheriff, Serial No. 766,558, filed August 6, 1947.

The lower boss 42 of the load supporting carriage 38 is adapted to have secured to it mechanism which comprises my present invention, namely, the pallet retaining mechanism which is indicated generally by the reference numeral 74. The pallet retaining mechanism 74 comprises a plate 76 which extends across the front of the industrial truck and is secured to the boss 42, said plate 76 having secured to its lower edge a forwardly extending load supporting member, or members, 78 on the surface of which a load and its pallet are adapted to be carried and supported during transit from one location to another. The load supporting member is tapered adjacent its forward end as may be seen most readily in Figure 1. Adjacent either end of the plate 76 and on either side of the truck are secured rearwardly extending brackets 80 which support the actuating elements of the pallet retaining mechanism. It will be observed that the load engaging mechanism 34, comprising the frame 60 and the jaw members 36 and 64, is adapted to pass above the load supporting surface of the platen, or platens, 78 so that a load which is resting on said surface may be pushed therefrom by the load engaging mechanism when the latter is moved forwardly across the load supporting platform 78. The pallet retaining mechanism comprises in its preferred form a bar or shaft 82 extending transversely across the load supporting platform 78 and held at its outer ends by arm 84, each of which is secured at its opposite end by a pin 86 to a shaft 88, which has pivotal movement in the supporting bracket 80. On the inboard side of each bracket 80, the shaft 88 is connected to a crank arm 90 which has a pivotal connection, as at 92, to a piston rod 94 which is connected to a piston 95 which is reciprocable in a hydraulic cylinder 96. The hydraulic cylinder 96 has a packing gland 98 at that end through which the piston rod 94 moves and adjacent said gland contains a hydraulic passageway 100 leading into the cylinder. At the opposite end of the cylinder 96 there is another hydraulic passageway 102 located on the opposite side of the piston 95. At its left end (as viewed in Figure 2) the cylinder 96 is pivotally connected, as at 104, to a bracket 106 which is connected to the free end of the main supporting bracket 80.

When fluid, under pressure, enters the passageway 102 of the cylinder 96 the piston is moved outwardly and to the right (as viewed in Figure 2) so that the piston rod 94 may actuate the crank arm 90 in a clockwise direction and thereby cause arc arm 84 and the bar or shaft 82 to rotate counterclockwise also to the position shown in Figure 2. At such time, fluid under pressure on the opposite side of the piston within cylinder 96 flows out through the passageway 100. When fluid under pressure enters the passageway 100 and fluid on the opposite side of the piston is discharged through the passageway 102, the piston rod 94 is retracted and cranks the crank arm 90 and the connected arm 84 and bar 82 in a counterclockwise direction. The path of the bar 82 is indicated by the dot-dash line A of Figure 2.

It will be observed that in its lowermost position, as shown in Figure 2, the bar 82 is adapted to seat below the surface of the load supporting platform 78 in a recess 108 which extends transversely of the load supporting platform 78 so that the frame 60 and the fixed jaw 64 at the lower end of frame 60 of the load engaging mechanism 34 may freely pass over the bar during movement of the mechanism 34 toward and away from the truck. It will be noted that, in the form shown, the recess 108 is provided by reason of the load supporting platform 78 being welded to a short, forwardly extending plate 110 which is connected to the plate 76 and extends transversely across the front of the truck. It will be appreciated that a recess could be formed in other manners and in a single plate which would by itself constitute the load supporting platform.

While the pallet retaining mechanism 74 may be actuated by a separate control for directing fluid under pressure into or out of the hydraulic cylinder 96, in the preferred form of my invention the hydraulic cylinder 96 is connected in parallel with the hydraulic cylinder which actuates the tilting mechanism for the mast 18. If reference will now be made to Figure 8, the parallel arrangement of the hydraulic cylinders will be described. Within cylinder 112, which will be referred to as the tilt cylinder, is located piston 114 having a piston rod 116. Piston rod 116 is adapted to be connected to the mast 18 while the cylinder 112 is connected pivotally at its other end 118 to the chassis of the industrial truck. A fitting 120 is connected to end 118 of the cylinder 112 and is adapted to admit fluid to the inside of the cylinder at one side of piston 114. The T fitting 120 has one opening connected to a source of hydraulic fluid under pressure and has its other opening connected to the conduit or hose 122 which, in turn, is connected to a fitting 124 which is threaded into the passageway 102 of cylinder 96. At the gland end of the piston 112 a fitting 126 is adapted to have communication with the interior of cylinder 112 on the right-hand side of piston 114 (as viewed in Figure 8). The fitting 126 is connected to a T connection 127, one opening of which returns to the hydraulic reservoir (not shown) and control mechanism for delivering hydraulic fluid under pressure, and the other opening of which is connected to a hose or conduit 128 which, in turn, is connected to a fitting 130 which is threaded into the passageway 100 of the cylinder 96. Interposed in conduit 128 is a shut-off valve 132 by which the operator may eliminate operation of cylinder 96 which actuates the pallet retaining mechanism 74. Valve 132, therefore, provides a means for selectively eliminating the operation of the pallet retaining mechanism.

It will be readily apparent that the operator, by manipulating the control lever 30 to cause fluid under pressure to enter the tilt cylinder 112 through fitting 120, may cause the piston 114 to tilt forwardly with respect to the industrial truck the mast which is connected to the piston rod 116. Simultaneously, fluid under pressure will flow through conduit 122 and fitting 124 into the cylinder 96 and will actuate the piston 95 in the same direction, thereby causing the pallet retaining mechanism 74 to rotate clockwise and into the position shown in Figure 8. At this time, fluid is flowing from the right-hand sides of the respective hydraulic cylinders 96 and 112 (as viewed in Figure 8) and out of the T connection 127 and back to the hydraulic reservoir and the hydraulic control mechanism under the control of the operator.

When the operator desires to tilt the mast 18 backwardly, the control lever 30 is manipulated to cause fluid under pressure to enter the T connection 127 and to pass therefrom through the fitting 126 into the cylinder 112, while simultaneously flowing through the conduit 128 and fitting 130 into the cylinder 96. The fluid under pressure will thereby cause the pistons 114 and 95 to be moved to the left (as viewed in Figure 8) whereupon the mast 18 will be tilted rearwardly and the pallet retaining mechanism 74 will be rotated in a counterclockwise direction by means of the piston rod 116 to the dot-dash line position "B" of Figure 8. At this time, fluid is exhausted from the left-hand ends of the cylinders 112 and 96 and passes to the T shaped fitting 120 and thence to the hydraulic reservoir and the hydraulic control mechanism. It will be seen that if valve 132 in conduit 128 is closed, the necessary flow of hydraulic fluid under pressure into and out of cylinder 96 will be prevented and consequently, only piston 114 and its piston rod 116 will be actuated.

It will be understood that the tilt cylinder 112 and the cylinder 96 for actuating the pallet retaining mechanism 74 may be connected by separate lines to separate control mechanisms at the disposal of the operator so that they may be independently manipulated.

Turning now to Figures 4 through 7, it will be recalled that the load engaging mechanism 34 and its clamping means comprising a fixed jaw 64 and the movable jaw 36 are adapted to operate in a pre-determined sequence, as set forth in the copending application of myself and Fred Sherriff, Serial No. 766,558, filed August 6, 1947. When the load engaging member 34, under the control of the operator, is actuated in a forward direction, the movable jaw 36 is first moved upwardly from the fixed jaw 64 before the load engaging mechanism 34 moves forwardly over the load supporting platform 78. When the movable jaw 36 is retracted, then the load engaging mechanism 34 will automatically move outwardly over the platform 78 to the outer end thereof so that the fixed jaw 64 protrudes beyond said platform and into a position under the margin of a sheet-like pallet. The clamping mechanism is adapted to close when the operator actuates the control lever 32 to cause the load engaging mechanism to be retracted. That is to say, after the vertically movable jaw 36 has descended and pressed the sheet-like pallet against the fixed jaw 64 and into the groove 66, the load engaging mechanism is then adapted automatically to be retracted and to thereby draw the pallet and any load which rests thereon on to the load supporting platform 78 so that said load may be transported from place to place by the industrial truck, as desired. As was pointed out earlier, the load may be raised on the mast 18 at any time, either before, during or after the transporting operation.

Assuming now that the load engaging mechanism 34 is being retracted and is gripping the margin of a sheet-like pallet, such as the pallet 134 of Figure 4, it will be seen that the load 136 will be drawn on to the load supporting platform 78. The load engaging mechanism 34 continues rearwardly until it is adjacent the plate 76 of the pallet retaining mechanism 74. If, following this operation, the operator desires to discharge the load, together with its pallet, from the load supporting platform 78, control lever 32 is manipulated in an opposite manner whereupon the movable jaw 36 is first retracted followed by movement of the load engaging mechanism 34 against the load 136 to push it outwardly off of the load supporting platform 78. The pallet 134, by reason of the greater co-efficient of friction between the load and itself than between itself and the platform 78, will be drawn off with the load.

However, if the operator desires to discharge the load 136 from the load supporting platform or platen 78 while yet retaining the pallet on said platform, he will momentarily manipulate the control lever 32 to cause a retraction of the movable jaw 36 from the fixed jaw 64 whereupon the control lever will be returned to neutral before the load engaging mechanism 34 is caused to move against said load and forwardly over the load supporting platform 78. Then the operator will manipulate the control lever 30, which controls the tilt cylinder 112 and the cylinder 96, in such a fashion that the mast 18 and the load engaging carriage 28 will be tilted rearwardly and simultaneously each piston rod 94 will be retracted into its hydraulic cylinder 96 and simultaneously will rotate the crank arms 90 in a counterclockwise direction. Arms 90 will thereby be rotated in a counterclockwise direction and the bar 82 will be moved arcuately upwardly from out of the recess 108 and will lift the margin of the pallet 134, as shown in Figure 5, and then pass beyond said margin to a position above it.

At that time, the operator will manipulate the control lever 30 in such a fashion that the mast 18 and the load supporting carriage 28 will be tilted forwardly while simultaneously the piston rods 94 on each side of the industrial truck will extend from their respective hydraulic cylinders 96 and thereby rotate the crank arms 90 in a clockwise direction so that the bar 82 will be moved arcuately downwardly on top of the pallet 134 and into the position shown in Figure 6 where the margin of the pallet is held between the bar 82 and the surface of the load supporting platform in the recess 108.

Although a cylindrical bar 82 is shown as the means for clamping the margin of the pallet 134 against the load supporting platform, it will be understood that the bar may take other cross-sectional shapes, or might have a plurality of downwardly extending projections which would themselves press against the pallet at spaced apart points. There also might be substituted for the bar, which extends entirely across the load supporting platform, a short stub section connected only by one end to each arm 84 at either side of the load supporting platform.

The bar 82, having been moved to the position shown in Figures 6 and 7, the operator may now actuate the control lever 32 to cause the load engaging mechanism to move forwardly across and above the rod 82 against the load 136, and to push the load across the pallet 134 and load supporting platform 78, and ultimately to discharge the load completely from the pallet and platform while the pallet 134 is retained on said platform. Thereafter, if it is desired to separately remove the pallet from the load supporting platform 78, the operator manipulates the control lever 30 to cause a rearward tilting of the mast and simultaneously to cause a counterclockwise rotation of the arms 84 which carry the rod 82 so that the rod 82 will be lifted upwardly and away from the load supporting platform. The pallet may then be easily withdrawn from the recess 108, and the load supporting platform 78.

If the operator desires to render ineffective the pallet retaining mechanism, he first causes it to be moved to the lowermost position shown in the various figures of the drawings, wherein it lies in the recess 108 below the level of the upper surface of the load supporting platform 78. Then valve 132 (see Figure 8) in conduit 128 is closed to prevent the flow of fluid into or out of the hydraulic cylinder 96, while yet permitting the flow of fluid under pressure into and out of the tilt cylinder 112. When that is done, the operator will be able to employ the load engaging mechanism 34, comprising the pusher frame 60 and clamping jaw 36 and 64, independently of the pallet retaining mechanism.

It will be readily apparent from Figures 1 and 2, that the pallet retaining mechanism 74 constitutes a unitary structure, which may be readily engaged and disengaged from the boss 42 of the load supporting carriage 38. It is, therefore, a very simple matter to remove the pallet retaining mechanism 74, and to substitute a different form of load supporting platform, for example, standard fork plates.

While I have shown a preferred embodiment of the invention, it will be apparent that various details of construction may be varied without departing from the scope of the invention, and I therefore do not intend to be limited to the illustrated embodiment, except insofar as the appended claims are so limited.

I claim:

1. For use with an industrial truck having an upwardly and downwardly movable load supporting carriage, the combination of load supporting means adapted to be secured to said load supporting carriage, said load supporting means including a load supporting member, load engaging means movable over said member and including clamping means adapted to grip a sheet-like pallet having a load thereon to draw it onto said member, and pallet retaining means adapted to retain the sheet-like pallet on said member when the load engaging means is employed to discharge the load from said pallet.

2. For use with an industrial truck having an upwardly and downwardly movable load supporting carriage, the combination of load supporting means adapted to be secured to said load supporting carriage, said load supporting means including a load supporting member, a vertically disposed pusher adapted to be extensible and retractable over said member, clamping means secured to the lower edge of said pusher adapted to grip a margin of a sheet-like pallet, a bar member adapted to selectively retain a sheet-like pallet between it and said load supporting means, and means for moving said bar toward and away from said load supporting means.

3. For use with an industrial truck having an upwardly and downwardly movable load supporting carriage, the combination of load supporting means adapted to be secured to said load supporting carriage, said load supporting means including a load supporting member, a vertically disposed pusher adapted to be extensible and retractable over said member, clamping means secured to the lower edge of said pusher adapted to grip a margin of a sheet-like pallet, a bar member adapted to retain selectively a sheet-like pallet between it and said load supporting means, means for moving said bar member toward and away from said load supporting means, and control means for said last named means whereby the operator is enabled selectively to so position the bar that said sheet-like pallet is retained between it and the load supporting means so that the pusher may discharge a load from the pallet or to so position the bar that the pallet is permitted to be discharged with a load thereon from the load supporting member by the pusher.

4. The combination of claim 2 wherein the bar is movable vertically into or out of engagement with said surface and is adapted to lie beneath the plane of movement of said clamping means.

5. The combination of claim 2 wherein the means for moving the bar is hydraulically operated.

6. For use with an industrial truck having an upwardly and downwardly movable load supporting carriage, the combination of load supporting means having a transversely extending recess and adapted to be secured to said load supporting carriage, said load supporting means including a load supporting member, a vertically disposed pusher adapted to be extensible and retractable over said member, clamping jaws secured to the lower margin of said pusher and extending transversely of said member, a bar extending transversely of said load supporting means and adapted to retain a sheet-like pallet between it and the recess portion of said load engaging means, and means for selectively moving said bar vertically into and out of engagement with said recess in said load supporting means.

7. For use with an industrial truck having an upwardly and downwardly movable load supporting carriage, the combination of load supporting means adapted to be secured to said load supporting carriage, said load supporting means including a load supporting member, means movable over said load supporting member and adapted to grip a sheet-like pallet having a load thereon to draw it onto said member, and means for retaining the pallet on said member while the load is being pushed off of said member by said means movable over the latter.

8. For use with an industrial truck having a tiltable mast, a load supporting carriage mounted for upward and downward movement in said mast, the combination of load supporting means adapted to be secured to said load supporting carriage, said load supporting means including a load supporting member, a load engaging member movable over said load supporting member and having clamping means secured along the lower edge thereof, said clamping means being adapted to grip a pallet having a load thereon to draw it onto said load supporting member, means for retaining said pallet on said load supporting member when said load engaging member is employed for discharging the load from said pallet, means for causing tilting of said mast and carriage, said last-named means acting to render said retaining means ineffective when the mast is tilted in one direction and to render said retaining means effective when the mast is tilted in another direction.

9. For use with an industrial truck having a mast at the forward end thereof and a load supporting carriage movable upwardly and downwardly within said mast, the combination of load supporting means adapted to be secured to the load supporting carriage, load engaging means movable fore and aft over said load supporting means, clamping means secured to the lower edge of said load engaging means for gripping the margin of a sheet-like pallet to draw it onto said load supporting means, pallet retaining means carried by said load supporting means and being adapted to retain the pallet on the load supporting means when a load is being pushed off of the pallet by said load engaging means, means for actuating said pallet retaining means, means for tilting said mast and said load supporting member, selectively operable control means for effecting actuation of said last named means, and said pallet retaining actuating means being responsive to tilting movement of said mast and load supporting member.

10. The combination of claim 9 wherein the control means for tilting said member is hydraulically actuated.

11. The combination of claim 9 wherein the actuating means for the pallet retaining means and the control means for tilting the load supporting member include hydraulic cylinders connected in parallel, and valve means for rendering ineffective the hydraulic cylinder for said actuating means.

12. For use with an industrial truck having a generally vertically extending tiltable mast at one end thereof, a load supporting carriage movable upwardly and downwardly within said mast, the combination of load supporting means adapted to be secured to said load supporting carriage, a pusher movable across said load supporting means, clamping means including a fixed jaw and a vertically movable blade disposed at the lower edge of said load engaging means, pallet retaining means carried by said load supporting means comprising a bar extending transversely of said load supporting means, means carried by said load supporting means for moving said bar vertically into and out of engagement with said load supporting means, and said bar being adapted to be positioned beneath the plane of movement of said clamping means.

13. The combination of claim 12 wherein the actuating means for the pallet retaining means is responsive to the direction in which the load supporting carriage is tilted.

14. For use with an industrial truck having a vertically extending tiltable mast at one end thereof, a load supporting carriage movable upwardly and downwardly within said mast, the combination of load supporting means adapted to be secured to said load supporting carriage, pallet retaining means carried by said load supporting means adjacent said load supporting carriage, said pallet retaining means comprising a bar extending transversely of said load supporting means, said bar being vertically movable into and out of engagement with said load supporting means for gripping a sheet-like pallet between it and said load supporting means, and means carried by said load supporting means for actuating said pallet retaining means.

GEORGE L. TURNER.

References Cited in the file of this patent

UNITED STATES PATENTS

| Number | Name | Date |
|---|---|---|
| 2,256,454 | Bomar | Sept. 16, 1941 |
| 2,302,137 | Neuman | Nov. 17, 1942 |
| 2,371,661 | Wilms | Mar. 20, 1945 |
| 2,394,692 | Isler | Feb. 12, 1946 |
| 2,394,693 | Golrick | Feb. 12, 1946 |
| 2,421,128 | Pride | May 27, 1947 |
| 2,459,045 | Pride | Jan. 11, 1949 |
| 2,576,482 | Rydner | Nov. 27, 1951 |
| 2,590,355 | Turner et al. | Mar. 25, 1952 |